Patented Mar. 4, 1924.

1,486,077

UNITED STATES PATENT OFFICE.

LOUIS C. DREFAHL, OF LAKEWOOD, AND EDWARD A. TAYLOR, OF CLEVELAND, OHIO, ASSIGNORS TO THE GRASSELLI CHEMICAL COMPANY, OF CLEVELAND, OHIO, A CORPORATION OF OHIO.

PROCESS OF MAKING LITHOPONE.

No Drawing.   Application filed March 6, 1922. Serial No. 541,582.

*To all whom it may concern:*

Be it known that we, (1) LOUIS C. DREFAHL and (2) EDWARD A. TAYLOR, citizens of the United States, residing at (1) Lakewood, (2) Cleveland, in the county of Cuyahoga and State of Ohio, have invented certain new and useful Improvements in Processes of Making Lithopone, of which the following is a specification.

This invention relates to a process of making lithopone and to the resulting improved product.

Lithopone is extensively used as a paint pigment, in the manufacture of rubber goods, and for other purposes, and is manufactured in large quantities by standard processes which comprise the following:—

Solutions of zinc sulfate and barium sulfid prepared in any suitable manner are mixed in suitable proportions in the neighborhood of equimolecular proportions and at a suitable temperature. For the purpose of improving the physical properties of the resulting precipitate it has become customary to employ so-called conditioning agents. The conditioning agent may be present naturally in one or both the zinc sulfate and the barium sulfid solutions or it may be added thereto either before or after the solutions are mixed or to the resulting precipitate. The conditioning agents may perform a useful function in the precipitation of the lithopone or in the subsequent drying or muffling operations or both. The particular conditioning agent or agents employed and the manner in which they are used varies considerably in the manufacture of lithopone in different plants but it is generally recognized that they effect or govern to a large extent the physical properties of the product. Conditioning agents heretofore employed have been inorganic salts and particularly common salt, sodium chlorid.

We have found that lithopone having particularly desirable properties can be made by the following procedure.

According to our process a barium sulfid solution is prepared in the usual manner, no special precautions being taken in this regard. In preparing the zinc sulfate solution, however, we are careful to have it as free as is practical from impurities. The zinc sulfate solution is prepared by standard procedure excepting that precautions are taken to obtain solutions as free as practical from impurities, particularly water soluble inorganic salts. For this purpose raw materials free from impurities are selected or the raw materials are purified by any suitable means, such as, washing, grading, etc. or the zinc sulfate solution prepared from impure raw materials is purified, for instance, by fractional crystallization of either the zinc sulfate or the impurities, or both expedients, that is, the use of pure raw materials and subsequent purification of the zinc sulfate solution may be employed in order to obtain a pure zinc sulfate solution.

The zinc sulfate and barium sulfide solutions are then brought together in the usual way as regards the manner of mixing the solutions, proportions of reagents, temperature of operation, and other standard conditions excepting that none of the so-called conditioning agents heretofore employed are added to the reaction mixture.

Instead of the usual conditioning agents we employ a small amount of a solution of an alkali metal silicate. A solution of sodium silicate of $42\frac{1}{2}°$ Bé. containing about 9 per cent $Na_2O$ and 30 per cent $SiO_2$, that is, sodium oxid and silica in the ratio of about 3.25 to 1 has been found to be suitable. It is to be understood however that the invention is not limited to the use of the specific sodium silicate solution defined. Solutions of different concentration and having different proportions of sodium oxid and silica may be employed. The sodium silicate solution may be added simultaneously with the mixing of the zinc sulfate and barium sulfide solutions or subsequent to the mixing of the solutions, that is, to the resulting precipitate and may be added in varying quantities, preferably in relatively small quantities. We have added sodium silicate solution of the composition defined above in quantity amounting to from 1 to 2 per cent of the weight of the finished dry lithopone product.

When the sodium silicate has been added and thoroughly mixed with the precipitate the product is dried, calcined in a muffle furnace, etc., according to the usual methods of making lithopone.

The properties of our product can best be appreciated by comparison with ordinary lithopone made by standard methods of manufacture.

The following is a tabulation of the results of the usual empirical physical tests on a sample of an ordinary product and on our product.

|  | Ordinary product. | Our product. |
| --- | --- | --- |
| Color dry | AA | AA+ |
| Color oil | A | AA— |
| Obscuring power | 90 | 125 |
| Oil absorption | 11.6 | 19 |
| Volume | 98 | 180 |
| Fineness | 98.51 | 99.9 |
| Sun test in water | Not sunproof. | Sunproof. |

From the above table the following noteworthy differences appear. Our product is whiter both dry and in oil than the ordinary product. The obscuring power of our product is about 30 per cent greater than the obscuring power of the ordinary product. The oil absorbing power of our product is greater than that of the ordinary product. The volume of our product is 80 per cent greater than the volume of an equal weight of the ordinary product. Our product is sunproof whereas the ordinary product is not sun proof.

Our new product approaches more nearly the properties of zinc oxid than does the ordinary product.

Under the microscope our product is seen to be much more finely divided than the ordinary product.

The chemical composition of our product is not materially different from the composition of the ordinary product.

The following table gives the per cent of the principal constituents of our product and the ordinary product.

|  | Ordinary product. | Our product. |
| --- | --- | --- |
| Zinc sulfid | 28.54 | 28.28 |
| Zinc oxid | .53 | 1.40 |
| Barium sulfate | 70.13 | 69.74 |

We claim:

1. Process of making lithopone which comprises, reacting upon a solution of barium sulfid with a solution of zinc sulfate, said zinc sulfate solution substantially free from water soluble inorganic salts other than zinc sulfate, and incorporating an alkali metal silicate in the resulting precipitate.

2. Process of making lithopone which comprises, reacting upon barium sulfid with zinc sulfate, mixing the reaction product with an alkali metal silicate, and calcining the mixture.

3. Process of making lithopone which comprises, mixing a solution of barium sulfid with a solution of zinc sulfate, adding an alkali metal silicate to the mixed solutions, and separating the resulting precipitate.

4. Process of making lithopone which comprises, mixing solutions of barium sulfid and zinc sulfate, said zinc sulfate solution substantially free from water soluble impurities, and adding a solution of sodium silicate to the resulting precipitate.

5. Process of making lithopone which comprises, mixing a solution of barium sulfid with a solution of zinc sulfate and adding a solution of sodium silicate of 42.5° Bé. containing sodium oxid and silica in the ratio of 3.25 to 1 in quantity amounting to from 1 to 2 per cent of the weight of the resulting precipitate in the dry state.

6. Process of making lithopone which comprises, precipitating lithopone in the absence of any conditioning agent, and mixing the precipitate with a relatively small amount of a solution of sodium silicate prior to calcining the same.

7. A lithopone product having relatively great obscuring power, oil absorbing capacity, volume, and fineness and being substantially sunproof and white in both the dry state and when mixed with oil, such as may be prepared by the herein described process which comprises reacting upon a solution of barium sulfid with a solution of zinc sulfate, and adding a small amount of a solution of sodium silicate to the resulting precipitate.

In testimony whereof, we affix our signatures.

LOUIS C. DREFAHL.
EDWARD A. TAYLOR.